United States Patent [19]

Johnston

[11] 4,275,393
[45] Jun. 23, 1981

[54] METHOD AND APPARATUS FOR SENSING PRESSURE

[75] Inventor: Max M. Johnston, Russellville, Ark.

[73] Assignee: Polyvend Inc., Conway, Ark.

[21] Appl. No.: 54,420

[22] Filed: Jul. 3, 1979

[51] Int. Cl.³ .................. G08B 21/00; G08D 5/34
[52] U.S. Cl. .................................. 340/688; 73/705;
250/231 R; 340/626
[58] Field of Search .............. 340/688, 626; 73/431,
73/705, 709; 250/231 R, 231 P, 231 SE;
324/96, 157

[56] References Cited

U.S. PATENT DOCUMENTS

| | | | |
|---|---|---|---|
| 2,142,602 | 1/1939 | Blethen | 250/231 R |
| 3,363,148 | 1/1968 | Freeman | 340/688 X |
| 3,633,039 | 1/1972 | Herbstman et al. | 250/231 R |
| 3,863,067 | 1/1975 | Godley | 250/231 R |

FOREIGN PATENT DOCUMENTS

| | | | |
|---|---|---|---|
| 2454203 | 5/1976 | Fed. Rep. of Germany | 340/688 |
| 1079495 | 8/1967 | United Kingdom | 340/688 |

Primary Examiner—John W. Caldwell, Sr.
Assistant Examiner—Daniel Myer
Attorney, Agent, or Firm—Hill, Van Santen, Steadman, Chiara & Simpson

[57] ABSTRACT

A pressure sensing device has a light source, and an optical sensor for externally sensing a predetermined change in the pressure within a sealed system which has a conventional gauge. Illumination from the light source is reflected off of the gauge dial and detected by the optical sensor. When the pressure in the sealed system changes a predetermined amount, the needle on the gauge moves so as to interrupt the illumination reaching the optical sensor. The optical sensor in turn produces a voltage that can be used to turn on a light or other indicator.

2 Claims, 3 Drawing Figures

METHOD AND APPARATUS FOR SENSING PRESSURE

BACKGROUND OF THE INVENTION

1. Field of the Invention

The invention pertains to the field of pressure indicators.

2. Background of the Invention

Many vending machines and other devices contain gas pressure distribution systems which receive their pressure from a replaceable gas supply. These gas supplies, very often carbon dioxide canisters, are replaced when a needle on a pressure gauge indicates that system pressure is too low for proper functioning.

While conventional gauges with a needle and a dial provide an adequate and accurate indication of system pressure, they are usually located within a closed unit and not monitored until the unit malfunctions.

Once a unit malfunctions, due to low pressure, an emergency service call is needed to restore it to operation as soon as possible.

Emergency service calls are expensive from a labor standpoint and represent a period of loss of machine service. On the other hand, it is undesirable to provide an additional pressure monitoring system that will substantially raise the cost of the machinery or perhaps impair the integrity of the pressure system.

There has thus been a need for an inexpensive, external, threshold monitoring system that might be installed on existing pressure systems, utilizing the available conventional pressure gauge, to provide a remote low pressure indicator.

SUMMARY OF THE INVENTION

An external pressure monitoring method is used in conjunction with a conventional pressure gauge to provide a remote indication that the pressure in the system has increased or decreased with respect to a predetermined threshold.

An apparatus practicing the method includes a bracket mounted on the gauge. A sensor unit having a source of illumination, such as a light emitting diode, and an optical sensor, such as a photo-transistor is held by the bracket in front of the dial on the gauge. The source of illumination directs light at the dial and the optical sensor detects light reflected off of the gauge dial and permits a corresponding current to flow between its input and its output terminals.

When the needle moves into a predetermined region on the gauge it reduces the light reflected onto the optical sensor. The current through the sensor changes providing an electrical signal indicative of the preselected threshold being crossed.

A multi-conductor cable provides power to the sensor unit and a path for the current from the sensor to flow to an adjacent electrical sensor unit.

The electrical sensor unit includes a pair of interconnected amplifier transistors that detect and amplify changes in current flow through the optical sensor. The amplified signal is used to provide a control voltage to the gate of a silicon-controlled rectifier. The anode of that rectifier is connected to an indicator light.

When the amplified signal at the gate of the silicon-controlled rectifier indicates that the needle has entered the selected region on the dial, the rectifier switches from a stable non-conducting state to a stable conducting state thereby permitting current to flow through the indicator lighting it up.

The indicator will remain illuminated due to the rectifier being latched in the conducting state until a reset switch is manually depressed removing power from the indicator and permitting the rectifier to revert to its stable, non-conducting state.

The steps of the method include, illuminating the dial, sensing illumination reflected off of a selected region of the dial and detecting when the needle on the gauge enters the selected region on the dial thereby decreasing the illumination reflected off of the dial.

DETAILED DESCRIPTION OF THE PREFERRED EMBODIMENT

Figure 1:
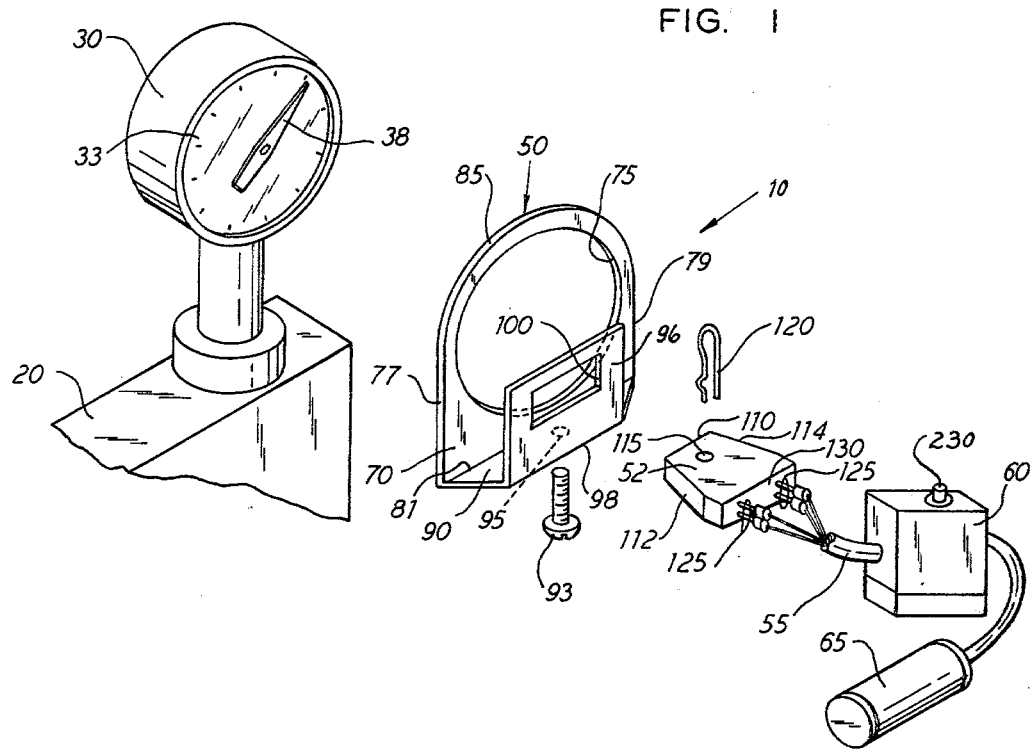
FIG. 1 is a perspective view showing the relationship of the bracket and sensor unit of the present invention to the system pressure gauge.
Figure 2:
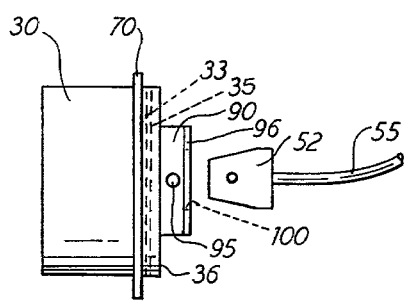
FIG. 2 is a top elevation of the gauge with the mounting bracket affixed to the gauge and the sensor unit mounted on the mounting bracket.
Figure 3:
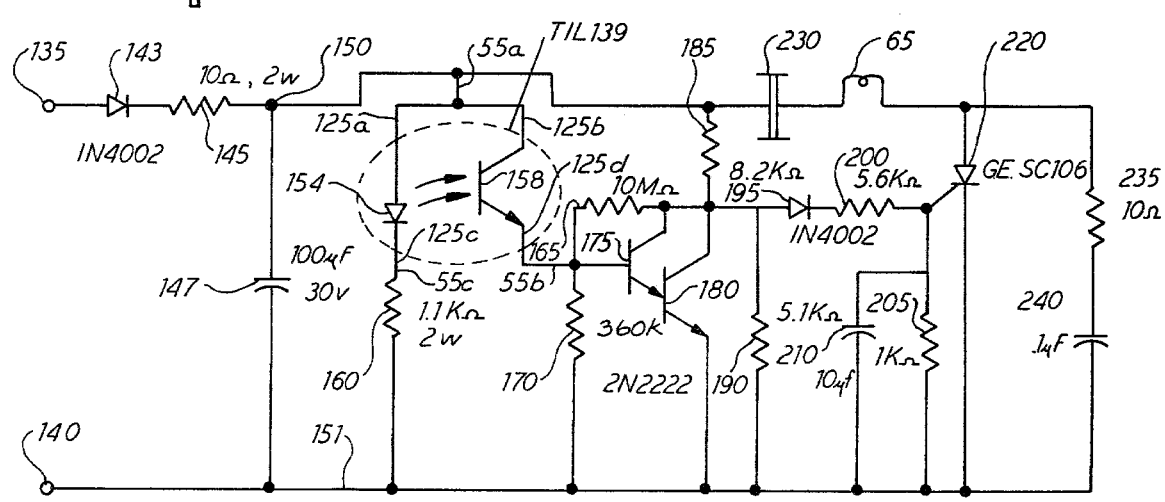
FIG. 3 is a schematic of the electronics of the inventive pressure monitoring device.

Not by way of limitation but for the purpose of enabling one of ordinary skill in the art to practice my method of sensing pressure and for the purpose of disclosing the best mode of my invention there is disclosed in FIGS. 1-3 an exemplary embodiment of my invention.

An external gas pressure monitoring device 10, in FIG. 1, is shown in perspective in relation to a closed pressure system 20. The pressure system 20 has a gauge 30 with a calibrated dial 33 a glass face 35 over the dial 33 with a front surface 36, and a pressure indicator needle 38. The gauge 30 is attached to the pressure system 20 to provide a visual indicator of the pressure within the system 20.

The gas pressure monitoring device 10 includes a mounting bracket 50, a sensor unit 52, a connection cable 55, a housing 60 which contains most of the electronics and an indicator light 65.

The mounting bracket 50 has a first planar member 70 with a hole 75 therein. The hole 75 has a diameter corresponding to the diameter of the gauge 30 so that the planar member 70 may be slid over the gauge 30. The planar member 70 is bounded by parallel edges 77, 79 which intersect a perpendicular edge 81. A curved edge 85 intersects and joins the parallel edges 77, 79.

The bracket 50 has a second planar member 90, perpendicular to the planar member 70 and joined thereto along the edge 81. A screw 93 extends through a threaded hole 95 in the second member 90. When the bracket 50 has been positioned against the gauge 30, the screw 93 is rotated so as to apply a force against the gauge 30 and lock the bracket 50 thereto.

The bracket 50 has a third planar member 96 which is substantially rectangular and joins the second planar member 90, along an edge 98, essentially perpendicular thereto. The member 96 extends essentially parallel to the dial 33 of the gauge 30 when the bracket 50 is affixed to the gauge 30. The third planar member has a rectangular slot 100 in which is located the elongated sensor unit 52.

The sensor unit 52 has a front surface 110 which is located adjacent the front surface 36 of the glass face 35 of the dial 33. The sensor unit 52 has a pair of edges 112, 114 oriented at an acute angle to the front edge 110. The edges 112, 114 abut sides of the slot 100 in the bracket member 96. The sensor unit 52 has a locking hole 115 through which a locking cotter pin 120 might pass to lock the sensor 52 to the third planar member 96 of the bracket 50. The electrical cable 55 enters the sensor 52 through a set of connections 125 at a rear edge 130. A Texas Instruments TIL 139 could be used as the sensor 52. It should be noted that other sensor units could be used without departing from the scope of my invention.

FIG. 2 is a top elevational view showing the member 70 of the bracket 50 located on the gauge 30. The sensor unit 52 is shown about to be inserted into the rectangular slot 100 of the bracket member 96.

FIG. 3 is a schematic of the electronic circuitry of the housing 60, including the electronics of the sensor unit 52. The electronics in FIG. 3 include a power supply section, the electronics for the sensor unit 52, an electronics sensing section having an amplifier portion and a latching power section.

Alternating current at twenty-four volts is applied at a pair of power input terminals 135, 140. The power supply section has a diode 143, a resistor 145 and a capacitor 147. The rectifier diode 143 has an anode connected to the terminal 135 and a cathode connected to a first end of the current limiting resistor 145. A second end of the resistor 145 is connected to a first end of the filter capacitor 147. A second end of the capacitor 147 is connected to the terminal 140 which is the electrical common for the circuit. The diode 143, resistor 145 and capacitor 147 form a half-wave rectifier power supply which supplies direct current power to the remainder of the electronics on a line 150 with a return line 151 connected to the terminal 140.

The sensor electronics, a solid state light emitting diode 154 [the source of illumination] and a photo-transistor 158, [the optical sensor] mounted within the sensor unit 52, receive power at terminals 125a, b, through a conductor 55a of the cable 55. An anode of the light emitting diode 154 is connected to the conductor 55a. A cathode of the diode 154 is connected, by a terminal 125c to a conductor 55a. Conductor 55c is also connected to a first end of a current limiting resistor 160. A second end of the resistor 160 is connected to the electrical common 151. A collector of the photo-transistor 158 is connected at the terminal 125b to the conductor 55a. An emitter of the photo-transistor 158 is connected at a terminal 125d to a conductor 55b.

The amplifier portion of the electronic sensor includes a pair of amplifier transistors 175, 180 that amplify the output of the optical sensor 158. The two transistors 175, 180 are connected in series to form a Darlington pair. The conductor 55b is connected to a first end of a resistor 165, a first end of a resistor 170 and a base of the first amplifier transistor 175. A second end of the resistor 170 is connected to the common line 151.

An emitter of the amplifier transistor 175 is connected to a base of the second amplifier transistor 180. An emitter of the transistor 180 is connected to the common line 151.

A collector of the transistor 175 is connected to a collector of the transistor 180, a second end of the resistor 165, a first end of a resistor 185, a first end of a resistor 190, and an anode of a noise rejecting threshold diode 195. A second end of the resistor 185 is connected to the power supply line 150. A second end of the resistor 190 is connected to the common line 151.

The amplified output from the collector, or selected terminal of the transistor 180 provides power to a control input of the latching power section which includes the silicon-controlled rectifier 220.

A silicon controlled rectifier (SCR) gate input circuit includes the diode 195, a voltage divider having two resistors 200, 205 in series and a noise suppression capacitor 210. A cathode of the diode 195 is connected to a first end of the resistor 200. A second end of the resistor 200 is connected to a first end of the resistor 205, a first end of the capacitor 210 and a gate input of a silicon controlled rectifier 220. A second end of the capacitor 210 and the resistor 205 are connected to the common return line 151.

The visual indicator 65 is connected at a first input to the power line 150 through a spring biased, normally closed reset switch 230. The indicator 65 is connected at a second input to an anode of the silicon-controlled-rectifier 220. A cathode of the rectifier 220 is connected to the common return line 151.

A resistor-capacitor series combination 235, 240 is connected between the anode and cathode of the silicon-controlled rectifier 220 to limit the rate of increase of voltage across the silicon-controlled rectifier whenever voltage is applied thereto.

As can be seen from FIG. 3, the light-emitting-diode 154 is constantly powered when the twenty-four volt AC is applied to the terminals 135, 140. With the bracket 50 mounted on the dial 30 and with the sensor unit 52 attached to the member 96, the light emitting diode 154 can be located so as to illuminate a selected region of the dial 33.

Photo-transistor or optical sensor 158, in the sensor unit 110 will detect the presence of illumination reflected off of the dial 33 and will permit current to flow between its collector and emitter based on the amount of reflected illumination sensed thereby.

The current outflow from the emitter of the optical sensor 158 is transmitted by the conductor 55b to the amplifying portion of the electrical sensing means. The input to the amplifying portion is at the base of the amplifying transistor 175. The amplified output current from the transistor 175 is coupled to the base of the amplifying transistor 180.

Because transistor 180 is conducting, the anode of the diode 195 has a voltage too low to result in triggering the (SCR) silicon-controlled-rectifier unit 220. The SCR thus remains in a stable non-conducting state and the indicator 65 stays turned off.

When the needle 38 of the gauge 30 moves into the selected region of the dial 33, due to a pressure increase or decrease, the amount of illumination, generated by the light source 154, and reflected off of the dial 33, is reduced. With less illumination falling on its input, optical sensor 158 conducts less. As a result, less current is available at the base of transistor 175 causing it to conduct less thereby tending to shut off the transistor 180. With transistor 180 tending to shut off, the voltage at the anode of diode 195 increases. With a great enough increase, diode 195 starts to conduct thereby applying a voltage to the control gate input to the SCR 220. When the gate voltage to the SCR 220 increases sufficiently, the SCR 220 switches or latches to a stable conducting thereby turning on the indicator 65.

Once the visual indicator 65 is turned on, indicating high or low pressure, it will stay turned on until the SCR 220 is turned off. The SCR 220 will continue to conduct until the reset button 230 is depressed thereby removing power from the indicator 65 and allowing the SCR 220 to turn off. Once the circuit of FIG. 3 is reset by the switch 230, it is ready to detect the next high-pressure or low-pressure condition.

Although various modifications might be suggested by those skilled in the art, it should be understood that I wish to embody within the scope of the patent warranted hereon all such modifications as reasonably and properly come within the scope of my contribution to the art.

I claim as my invention:

1. In a sensing apparatus for sensing the position of an indicator needle in a pressure gauge having an unaltered dial located behind the indicator needle, the sensing apparatus has a supporting clamp removably attachable to the gauge by a set-screw, the clamp supports a means for illumination and a light sensing means, an improvement wherein:

said clamp is formed with a planar first side with a hole therein such that the gauge is receivable within said hole, a planar base is connected at a first edge to an edge of said planar first side and is essentially perpendicular thereto, a planar second side is connected to a second edge of said base essentially parallel to said first side, said second side is positionable immediately in front of a glass cover over the indicator needle and dial of the gauge when the gauge is received within said hole in said first side, an elongated hole in said second side;

said means for illumination and said light sensing means are mounted within a shaped rigid housing and spaced with respect to one another, said housing has first and second surfaces on opposite sides thereof oriented at an angle with respect to one another;

a first region of said housing is extendable through said elongated hole in said second planar member, said first and second surfaces engage opposite edges of said elongated hole to position said housing along with said means for illumination and said light sensing means with respect to said clamp and to limit movement of said first region of said housing toward the gauge;

removable locking means to retain said housing within said elongated hole in said second planar member;

means for supplying energy connected to said means for illumination in said housing by removable connection means;

means for comparison connected to said light sensing means in said housing by said removable connection means to continuously monitor only a single indicia generated by said light sensing means, said single indicia is proportional to an amount of light generated by said means for illumination reflected off of a selected region of the unaltered dial and sensed by said light sensing means, said means for comparison compares said sensed single indicia to a preselected value, when said sensed single indicia drops below said preselected value due to the indicator needle moving between said means for illumination and the selected region of the dial, said means for comparison generates a predetermined signal;

means for latching responsive to said predetermined signal to continuously energize a means for visually signaling a selected pressure condition until said means for visually signaling is manually reset.

2. The improved sensing apparatus according to claim 1 wherein:

said means for comparison includes a Darlington connected pair of transistors, responsive to said sensed single indicia and said means for latching includes a semiconductor element having a stable conducting state and a stable non-conducting state such that when said means for comparison generates said predetermined signal said semiconductor element switches from said stable non-conducting state to said stable conducting state to continuously energize said means for visually signaling until said means for latching is manually reset.

* * * * *